United States Patent [19]
Boutaghou

[11] Patent Number: 6,075,677
[45] Date of Patent: *Jun. 13, 2000

[54] METHOD FOR POSITIONING A READ/WRITE HEAD TO REDUCE WEAR FOR PROXIMITY RECORDING IN A MAGNETIC DISK STORAGE SYSTEM

[75] Inventor: Zine-Eddine Boutaghou, Rochester, Minn.

[73] Assignee: Seagate Technology, Inc., Scotts Valley, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/879,913

[22] Filed: Jun. 20, 1997

Related U.S. Application Data

[62] Division of application No. 08/507,975, Jul. 27, 1995, abandoned.

[51] Int. Cl.[7] ........................................ G11B 5/82
[52] U.S. Cl. .............................................. 360/106
[58] Field of Search ................................. 360/105–106, 360/137, 75, 78.01, 78.04

[56] References Cited

U.S. PATENT DOCUMENTS

| | | | |
|---|---|---|---|
| 4,996,622 | 2/1991 | Takatsuki et al. | 360/135 |
| 5,062,021 | 10/1991 | Ranjan et al. | 360/135 |
| 5,144,512 | 9/1992 | Ota et al. | 360/135 |
| 5,166,006 | 11/1992 | Lal et al. | 428/612 |
| 5,225,955 | 7/1993 | Ito et al. | 360/135 |
| 5,328,740 | 7/1994 | Nakayama et al. | 428/64 |
| 5,388,020 | 2/1995 | Nakamura et al. | 360/135 |
| 5,488,524 | 1/1996 | Cunningham | 360/103 |
| 5,550,692 | 8/1996 | Crane | 360/103 |
| 5,612,839 | 3/1997 | Jacques | 360/103 |

FOREIGN PATENT DOCUMENTS

| | | |
|---|---|---|
| 57-167135 | 10/1982 | Japan . |
| 1-98118 | 4/1989 | Japan . |
| 1-140422 | 6/1989 | Japan . |
| 4-205964 | 7/1992 | Japan . |

*Primary Examiner*—Brian E. Miller
*Attorney, Agent, or Firm*—Westman, Champlin & Kelly, P.A.

[57] ABSTRACT

A magnetic disc drive storage system includes a magnetic storage disc and a proximate recording head. The proximate recording head is used for proximity reading and writing of information on the surface of the magnetic storage disc. An idle fly zone is provided on the surface of the magnetic storage disc. During idle periods, the proximity recording head is positioned over the landing fly zone. The landing fly zone provides a smooth surface to the proximity recording head whereby wear and particulate generate at the head/disc interface are reduced.

5 Claims, 3 Drawing Sheets

METHOD FOR POSITIONING A READ/WRITE HEAD TO REDUCE WEAR FOR PROXIMITY RECORDING IN A MAGNETIC DISK STORAGE SYSTEM

This is a divisional of application Ser. No. 08/507,975, filed Jul. 27, 1995 now abandoned. Priority of the prior application is claimed pursuant to 35 USC § 120.

BACKGROUND OF THE INVENTION

The present invention relates to magnetic disc storage systems for magnetically storing information. More specifically, the present invention relates to a technique for reducing wear in a magnetic disc storage system which uses a proximity recording head.

Magnetic disc drives are used to store magnetically encoded information. As the magnetic disc spins, a transducing head "flies" over and contacts the surface of the disc. The transducing head is used to sense magnetic fields from the disc surface during readback of information, and generate magnetic fields which are impressed onto the surface of the disc during writing of information. As the disc spins, the transducing head is supported by an "air bearing" which is formed between the disc surface and a slider body of the transducer head assembly. The slider body has aerodynamic properties which provide a lifting force.

It is known that improved magnetic interaction between the disc surface and the transducing head can be achieved by reducing the spacing between the head and the disc surface. One technique for reducing fly height is to employ a "proximity recording head." This provides a limited, intermittent contact between the recording head and the surface of the disc. There are two general types of proximity recording. These are glide contact (GC) recording and ultralow fly (ULF) recording. Glide contact assumes continuous contact between the slider and the disc. Ultralow fly recording assumes that there will be intermittent contact. One example of a proximity recording slider is described in U.S. Pat. No. 5,128,822 entitled "CONFIGURATION FOR NEGATIVE PRESSURE AIR BEARING SLIDERS," issued Jul. 7, 1992.

Proximity head recording provides the benefit of high areal density, which refers to the amount of information that can be stored per unit of disc area. Another means of providing high areal density is through magnetoresistive (MR) technology. MR technology currently suffers from the disadvantages of processing difficulties and poor manufacturing yields, which are reflected in higher prices. Proximity head recording provides high areal density at a substantially lower cost than its alternative, MR technology.

The continuous or intermittent contact between the head and the disc surface in proximity head recording, however, causes wear of the surfaces. This wear may result in release of particles which reduce the aerodynamic properties of the slider. Further, this can lead to debris collection on the slider surface, modulation of the readback signal and degradation of the lubrication at the interface.

One technique to reduce contact between the active, recording area of the disc surface and the slider as much as possible is to move the alternate slider to a resting position on the inner or outer tracks. Although this solution does not damage a single active track of the disc, the amount of wear on the slider and debris generation is not reduced.

SUMMARY OF THE INVENTION

The present invention provides a smooth idle fly zone on the surface of the disc. The idle fly zone is a radius of the disc which has been smoothed. During idle periods, the proximity recording head is positioned over the idle fly zone. This reduces wear and debris generation and their associated problems. In one embodiment, the idle fly zone is a radial track positioned approximately in the middle of the recording surface. Selective positioning of the idle fly zone is also contemplated.

A method of manufacturing a magnetic storage disc includes forming an idle fly zone on the recording surface of the disc. The idle fly zone is used with a proximity recording head and reduces wear at the head/disc interface during idle.

DETAILED DESCRIPTION OF THE PREFERRED EMBODIMENTS

Figure 1:
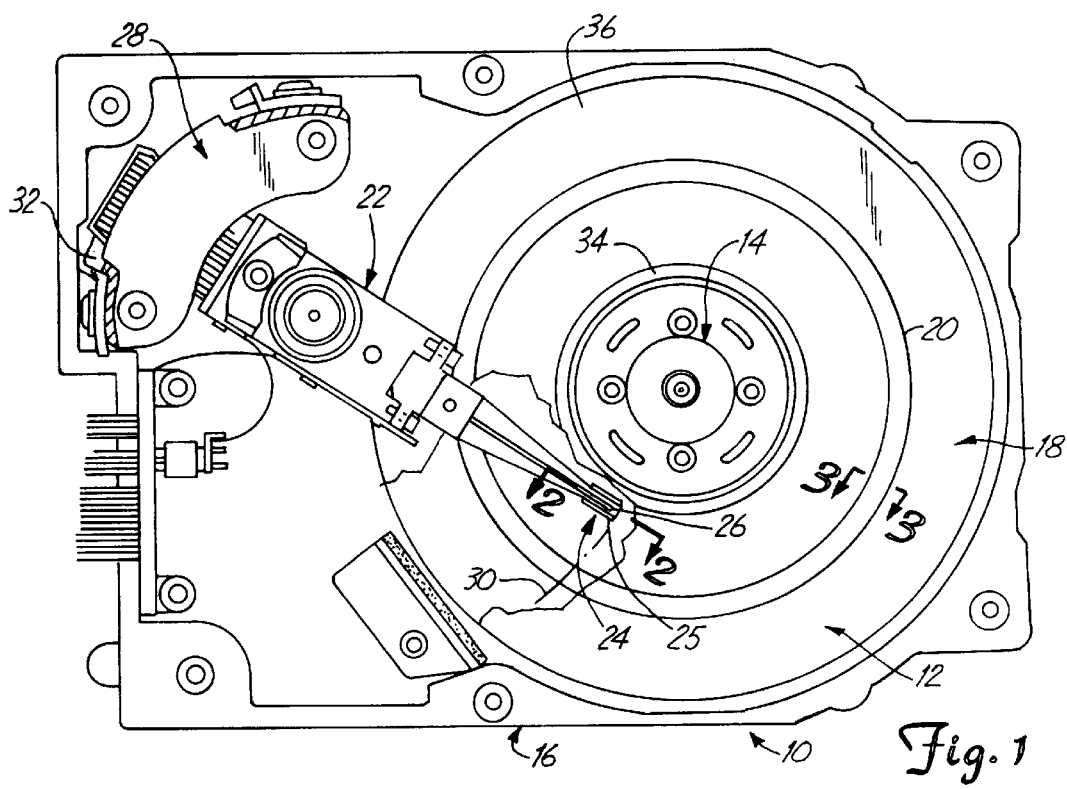
FIG. 1 is a top view of a disc drive with its upper casing removed and embodying features of the present invention.

Referring to FIG. 1, a rotary disc drive system suitable for incorporating the teaching of the present invention is shown in diagrammatic form and is referred to generally at 10. A plurality of magnetic information storage discs 12 are journaled about a spindle motor assembly 14 within a housing 16. Each magnetic disc 12 has a multiplicity of concentric circular recording tracks, indicated schematically at 18, for recording information. The disc 12 comprises a circular idle fly zone 20 which is concentric with the recording tracks 18. An actuator arm assembly 22 is rotatably mounted preferably in one corner of the housing 16. The actuator arm assembly 22 carries a plurality of head gimbal assemblies 24 that each carry a slider 25 having a magnetic proximity recording read/write head 26 for reading information from and writing information onto the magnetic discs 12. A voice coil motor 28 is adapted to precisely rotate the actuator arm assembly 22 back and forth such that the proximity recording heads 26 move across the magnetic discs 12 along arc 30. A magnetic latch 32 holds the actuator arm assembly 22 in place on a landing zone 34 when the disc drive 10 is not in use. The disc 12 includes a recording surface 36 which is generally textured. The idle fly zone 20 is preferably positioned in the center of the recording surface 36. Also, selective positioning of the idle fly zone 20 is contemplated.

Figure 2:
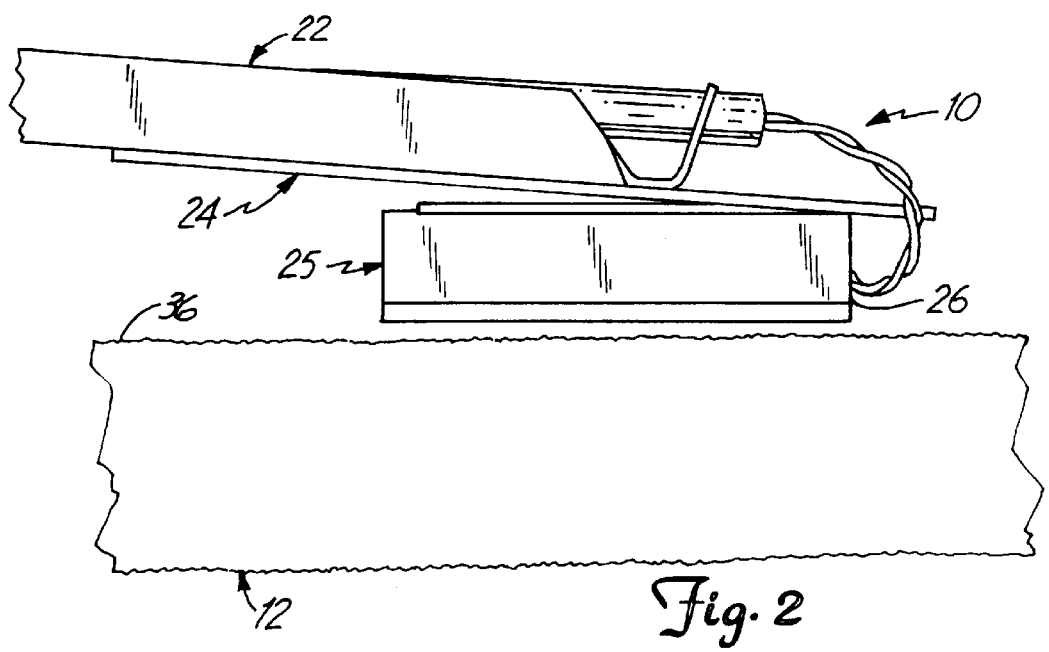
FIG. 2 is a schematic cross-section view of a portion of FIG. 1 taken along lines 2—2.

FIG. 2 is a schematic cross-section view of a portion of the disc drive system 10 of FIG. 1 taken along lines 2—2. The head gimbal assembly 24 resiliently supports the slider 25 over the disc 12. As the disc 12 rotates, the textured recording surface 36 drags air underneath the slider 25 which allows the slider 25 to "fly" over and contact the surface of the disc. The head gimbal assembly 24 allows the slider 25 to pitch and roll while the head gimbal assembly 24 follows the topography of the disc 12.

The aerodynamics of the slider 25 permits the proximity recording head 26 to contact the recording surface 36. This contact between the slider 25, recording head 26 and the recording surface 36 causes wear on the respective parts of the drive 10. This wear may result in release of particles which reduce the aerodynamic properties of the slider 25.

Further, this wear can lead to debris collection on the slider 25 which can adversely effect the proximity recording head 26.

It has been determined that the proximity recording head 26 is reading information from the writing information onto a recording surface 36 only approximately five to ten percent of the life of the drive 10. The remaining ninety to ninety-five percent of the time, the proximity recording head 26 is merely flying and contacting the disc surface. During the periods when the proximity recording head 26 is merely "flying", it is positioned over the idle fly zone 20.

Figure 2A:
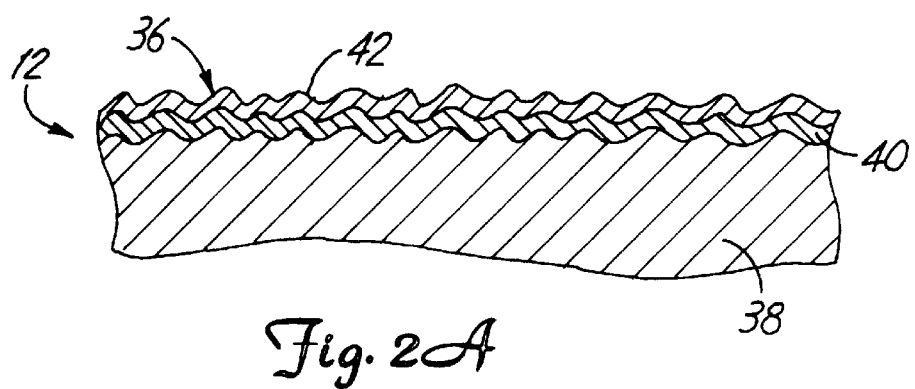
FIG. 2A is a schematic cross-section view of a portion of FIG. 2.

FIG. 2A is a cross-section view of a portion of the disc 12. The magnetic disc 12 is typically fabricated from a substrate 38 made from alumina, and having a layer of magnetic material 40 deposited thereon. Typically, the magnetic material 40 is covered with a layer of carbide 42. A textured recording surface 36 is desirable because it helps to drag air when rotating to allow the slider 25 to "take off". In other words, the amount of "stiction" between the disc 12 and slider 25 to be overcome is considerably less on a textured surface than on a smooth surface, the amount of stiction being approximately three or four grams for the former and thirty or forty grams for the latter.

Figure 3:
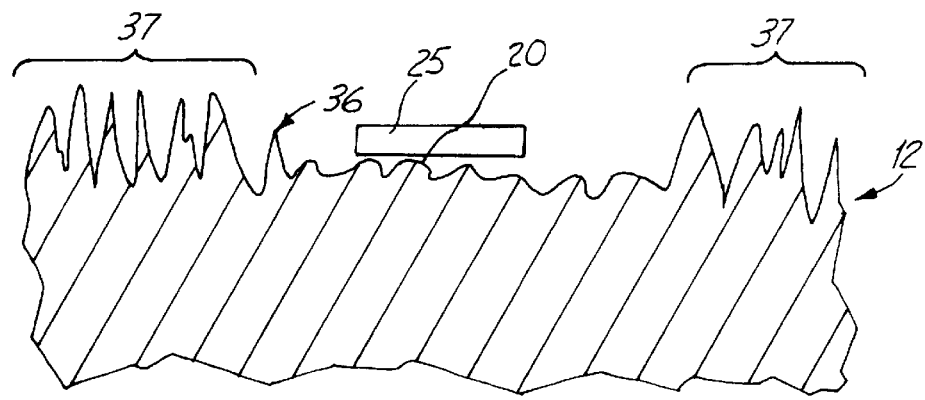
FIG. 3 is a schematic view of a portion of FIG. 1 taken along lines 3—3.

FIG. 3 is a schematic cross-sectional view of a portion of the disc drive system 10 of FIG. 1 taken along lines 3—3 and depicting one embodiment of the present invention. FIG. 3 shows an exaggerated view of the textured recording surface 36. The idle fly zone 20 is less textured than the other portions 37 of the recording surface 36. The idle fly zone 20 provides a smooth flying zone to provide a relief zone for the slider 35 to fly during idle operation, or when the proximity recording head 26 is not reading information from or writing information to the disc 12.

The idle fly zone 20 in this embodiment was achieved with a laser polish to effect a super-finished "smooth area" having "very low roughness". The other portions 37 are also polished, but are at "low roughness".

Preferably, when the slider 35 is above the idle fly zone 20, the slider 35 is in full fly or lightly in contact with a recording surface 36 to assure minimal wear generation or no wear generation in the slider 25 or disc 12. The reduced contact provides the advantage of extending the life of the disc drive system 10 by decreasing the wear between the disc 12 and slider 25 and reducing the amount of debris created thereby. The idle fly zone 20 is provided in the middle of the recording surface 36 so as to shorten the distance the slider 25 must travel along arc 30 when required to resume reading and writing.

Preferably, the slider should be in full fly when positioned over the idle fly zone 20 so as not to overcome the greater amount of stiction effected by the smooth idle fly zone 20. Also, preferably, the latch 32 does not hold the slider in place over the idle fly zone when the disc is not rotating. In the event that the slider does come to rest on the idle fly zone, the disc drive system 10 of the present invention is provided with a "jog algorithm" wherein the actuator arm 22 reciprocates slightly along arc 30 to overcome the stiction.

The idle fly zone 20 can be suitable for storing data and does not reduce the amount of usable recording surface 36 on a disc 12. In other words, the idle fly zone 20 is suitable to contain readable/writable data. In one embodiment, the width of the idle fly zone 20 between a first side 50 and a second side 52 is approximately five or six recording tracks 18, or several times the width of a proximity reading head 26.

Figure 4:
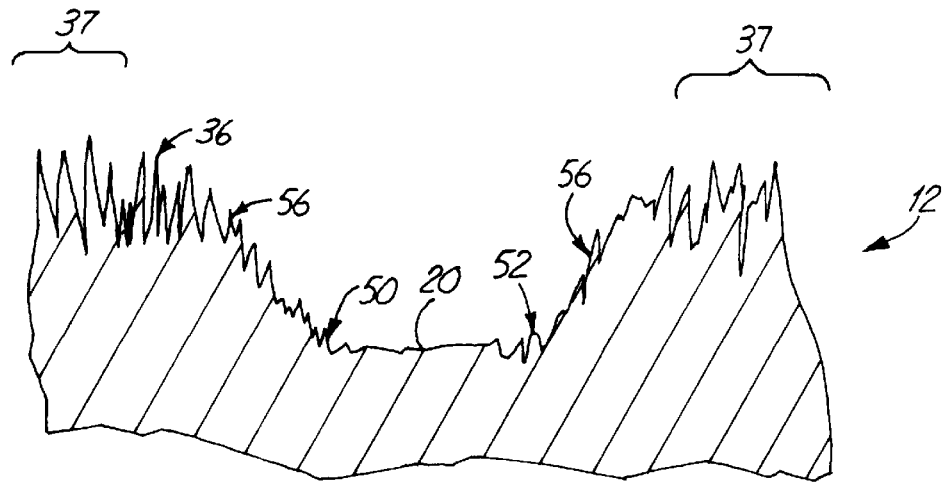
FIG. 4 is a schematic cross-section view of another embodiment of the invention.

FIG. 4 shows another schematic cross-sectional partial view of disc 12 depicting a second embodiment of the present invention wherein similar parts are represented by similar reference numerals. The idle fly zone 20 is provided with two transition zones 56 of gradually decreasing roughness mechanically polished in the disc 12 and adjacent to sides the 50, 52 of the idle fly zone 20. The transition zones 56 gradually taper the texture from portions 37 to the to the idle fly zone 20. The transition zones 56 provide the slider 25 entering the idle fly zone 20 with a smooth, generally continuous, change in aerodynamic profile between the more textured surface of portions 37 and the less textured surface of the idle fly zone 20. This permits the slider 25 to ease into and out of the idle fly zone 20. During the period when the recording head 26 is merely flying, and not reading or writing, the actuator arm assembly 22 positions the slider 25 over the idle fly zone 20.

The idle fly zone 20 is typically formed from polishing the substrate 38 with either a mechanical polish, laser polish, chemically (slurry), or a combination thereof. The mechanical polish is preferred to form transition zones 56 in the alumina. Thereafter, a layer of magnetic material 40 and a layer of carbide 42 are applied to the alumina substrate 38 to create the disc 12.

Although the present invention has been described with reference to preferred embodiments, workers skilled in the art will recognize that changes may be made in form and detail without departing from the spirit and scope of the invention.

What is claimed is:

1. A method of positioning a proximity recording read/write head on a recording surface of a magnetic disc in a magnetic disc storage system, comprising:

positioning the proximity recording read/write head on a recording surface of the magnetic disc, the recording surface having a first average surface height;

detecting an idle period during which the proximity recording read/write head is not reading or writing information;

positioning the proximity recording read/write head during the idle period from a read/write position to contact an idle zone defined in the recording surface and disposed between a plurality of other portions of the recording surface and wherein the idle zone is smooth relative to the other portions of the recording surface and has a second average surface height less than the first average surface height wherein during the step of positioning the read/write head onto the idle zone, the read/write head is moved to a lower height relative to the other portions of the recording surface.

2. The method of claim 1 and further comprising one of reading and writing information in the idle zone after the idle period.

3. The method of claim 1 wherein positioning the proximity recording read/write head over the idle zone comprises positioning the proximity recording head in a mid-portion of the magnetic disc.

4. The method of claim 1, wherein the proximity recording read/write head is adapted for glide contact proximity recording.

5. The method of claim 1, wherein the proximity recording read/write head is adapted for ultralow fly recording.

* * * * *